(12) United States Patent
Park et al.

(10) Patent No.: US 11,643,107 B2
(45) Date of Patent: May 9, 2023

(54) VEHICLE AND CONTROL METHOD THEREOF

(71) Applicants: Hyundai Motor Company, Seoul (KR); Kia Motors Corporation, Seoul (KR)

(72) Inventors: JongSung Park, Seoul (KR); Young Rok Choi, Gyeonggi-do (KR); Dae Sun Park, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 86 days.

(21) Appl. No.: 16/848,357

(22) Filed: Apr. 14, 2020

(65) Prior Publication Data
US 2021/0179139 A1   Jun. 17, 2021

(30) Foreign Application Priority Data

Dec. 16, 2019   (KR) .................. 10-2019-0168017

(51) Int. Cl.
*B60W 60/00* (2020.01)
*G01C 21/34* (2006.01)
*G07C 5/08* (2006.01)
*G07C 5/00* (2006.01)

(52) U.S. Cl.
CPC .... *B60W 60/0011* (2020.02); *B60W 60/0025* (2020.02); *G01C 21/3461* (2013.01); *G01C 21/3476* (2013.01); *G07C 5/008* (2013.01); *G07C 5/0816* (2013.01)

(58) Field of Classification Search
None
See application file for complete search history.

(56) References Cited

U.S. PATENT DOCUMENTS

| | | | |
|---|---|---|---|
| 9,716,787 B1* | 7/2017 | Prakah-Asante | H04W 4/16 |
| 2001/0020202 A1* | 9/2001 | Obradovich | B60K 35/00 |
| | | | 701/1 |
| 2012/0064881 A1* | 3/2012 | Svendsen | H04L 51/23 |
| | | | 455/422.1 |
| 2012/0220290 A1* | 8/2012 | Awad | H04L 67/18 |
| | | | 455/423 |
| 2014/0257695 A1* | 9/2014 | Annapureddy | G01C 21/3461 |
| | | | 701/537 |
| 2016/0311323 A1* | 10/2016 | Lee | B60K 35/00 |
| 2017/0334455 A1* | 11/2017 | Asakura | B60J 3/04 |
| 2018/0004211 A1* | 1/2018 | Grimm | G05D 1/0214 |
| 2018/0244175 A1* | 8/2018 | Tan | B60N 2/22 |
| 2018/0334062 A1* | 11/2018 | Park | B60N 2/14 |
| 2019/0086217 A1* | 3/2019 | Ibrahim | G01C 21/3407 |

(Continued)

*Primary Examiner* — James J Lee
*Assistant Examiner* — Tawri M Matsushige
(74) *Attorney, Agent, or Firm* — Fox Rothschild LLP

(57) ABSTRACT

A vehicle and control method thereof at provided to automatically activate preset devices within a vehicle based on a preset user selection function. The method vehicle includes receiving a selection of at least one user selection function preset in the vehicle and determining at least one vehicle environment associated with the user selection function in response to the selection of the at least one user selection function. Device control of the vehicle is performed related to the driving route setting of the vehicle or the at least one vehicle environment to support the at least one vehicle environment.

14 Claims, 8 Drawing Sheets

(56) References Cited

U.S. PATENT DOCUMENTS

| | | | |
|---|---|---|---|
| 2019/0366811 A1* | 12/2019 | O'Keeffe | B60W 40/12 |
| 2020/0008122 A1* | 1/2020 | Radko | H04W 4/40 |
| 2020/0033147 A1* | 1/2020 | Ahn | G01C 21/3461 |
| 2020/0189563 A1* | 6/2020 | Sakai | B60W 20/12 |
| 2020/0198658 A1* | 6/2020 | Suzuki | B60R 16/02 |
| 2020/0264629 A1* | 8/2020 | Maveddat | G05D 1/0276 |

* cited by examiner

VEHICLE AND CONTROL METHOD THEREOF

CROSS-REFERENCE TO RELATED APPLICATION

This application is based on and claims priority under 35 U.S.C. § 119 to Korean Patent Application No. 10-2019-0168017, filed on Dec. 16, 2019, the disclosure of which is incorporated herein by reference.

BACKGROUND

1. Field of the Disclosure

The present disclosure relates to a vehicle, and more particularly, to a control method of a vehicle for the convenience of the passenger.

2. Description of the Related Art

A driver within the vehicle must concentrate on driving the vehicle while the passengers within the vehicle are free to perform other activates while riding within the vehicle. For example, the passengers may listen to music, make phone calls, or work.

When the vehicle is an autonomous vehicle, even the driver is able concentrate on other tasks instead of driving. In autonomous vehicles, the vehicle is transformed into a space for rest or work beyond a simple transportation device.

SUMMARY

Therefore, the present disclosure provides a vehicle that improves occupant convenience by automatically activating the preset devices according to a preset user selection function.

In accordance with one aspect of the disclosure, a control method of a vehicle may include: receiving a selection of at least one user selection function preset in the vehicle; determining at least one vehicle environment associated with the user selection function in response to the selection of the at least one user selection function; and performing device control of the vehicle related to the driving route setting of the vehicle or the at least one vehicle environment to support the at least one vehicle environment.

The user selection function may include at least one of a meeting, sleep, streaming service, and payment service. The at least one vehicle environment may include at least one of a low noise state, a smooth communication state with the outside, a seat position adjustment and a security maintenance state. The performing device control of the vehicle may include: when the determined vehicle environment is in the low noise state, performing the driving route setting and the noise removal for avoiding the noise area.

The performing device control of the vehicle may include: when the determined at least one vehicle environment is the smooth communication state with the outside, performing the driving route setting for avoiding a communication shaded area. Additionally, the performing device control of the vehicle may include: when the driving route setting for avoiding the communication shaded area is impossible, performing the driving route setting with a route having a distance up to the initial communication shaded area entry that is the farthest distance.

The control method may further include: displaying a distance information up to the initial communication shaded area entry; and searching and displaying a smooth communication area in which the vehicle is capable of parking or stopping before entering the initial communication shaded area. The performing device control of the vehicle may include: when the determined vehicle environment is the seat position adjustment, operating a user seat to adjust to a preset angle and position. Additionally, the performing device control of the vehicle may include: when the determined vehicle environment is the security maintenance state, adjusting the glass transmittance of the vehicle.

The control method may further include: when the selection of the at least one user selection function is received, displaying a list of the at least one vehicle environment associated with the selected user selection function; receiving a user input for changing a set value of the at least one vehicle environment displayed; and performing the driving route setting and the device control of the vehicle by reflecting a setting value changed by the user input.

In accordance with one aspect of the disclosure, a vehicle may include: a selection device configured to select at least one user selection function preset in the vehicle; and a controller configured to determine at least one vehicle environment associated with the user selection function in response to the selection of the at least one user selection function and perform a device control of the vehicle related to the driving route setting of the vehicle or the at least one vehicle environment to support the at least one vehicle environment.

The user selection function may include at least one of a meeting, sleep, streaming service, and payment service. The at least one vehicle environment may include at least one of a low noise state, a smooth communication state with the outside, a seat position adjustment and a security maintenance state. The controller may be configured to, when the determined vehicle environment is in the low noise state, perform the driving route setting and the noise removal for avoiding the noise area. Additionally, the controller may be configured to, when the determined at least one vehicle environment is the smooth communication state with the outside, perform the driving route setting for avoiding a communication shaded area.

The controller may further be configured to, when the driving route setting for avoiding the communication shaded area is impossible, perform the driving route setting with a route having a distance up to the initial communication shaded area entry that is the farthest distance. The controller may be configured to display a distance information up to the initial communication shaded area entry, and search and display a smooth communication area in which the vehicle is able to park or stop before entering the initial communication shaded area. In addition, the controller may be configured to, when the determined vehicle environment is the seat position adjustment, operate a user seat to adjust to a preset angle and position. The controller may be configured to, when the determined vehicle environment is the security maintenance state, adjust the glass transmittance of the vehicle.

Further, the controller may be configured to, when the selection of the at least one user selection function is received, display a list of the at least one vehicle environment associated with the selected user selection function, receive a user input for changing a set value of the at least one vehicle environment displayed and perform the driving route setting and the device control of the vehicle by reflecting a setting value changed by the user input.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
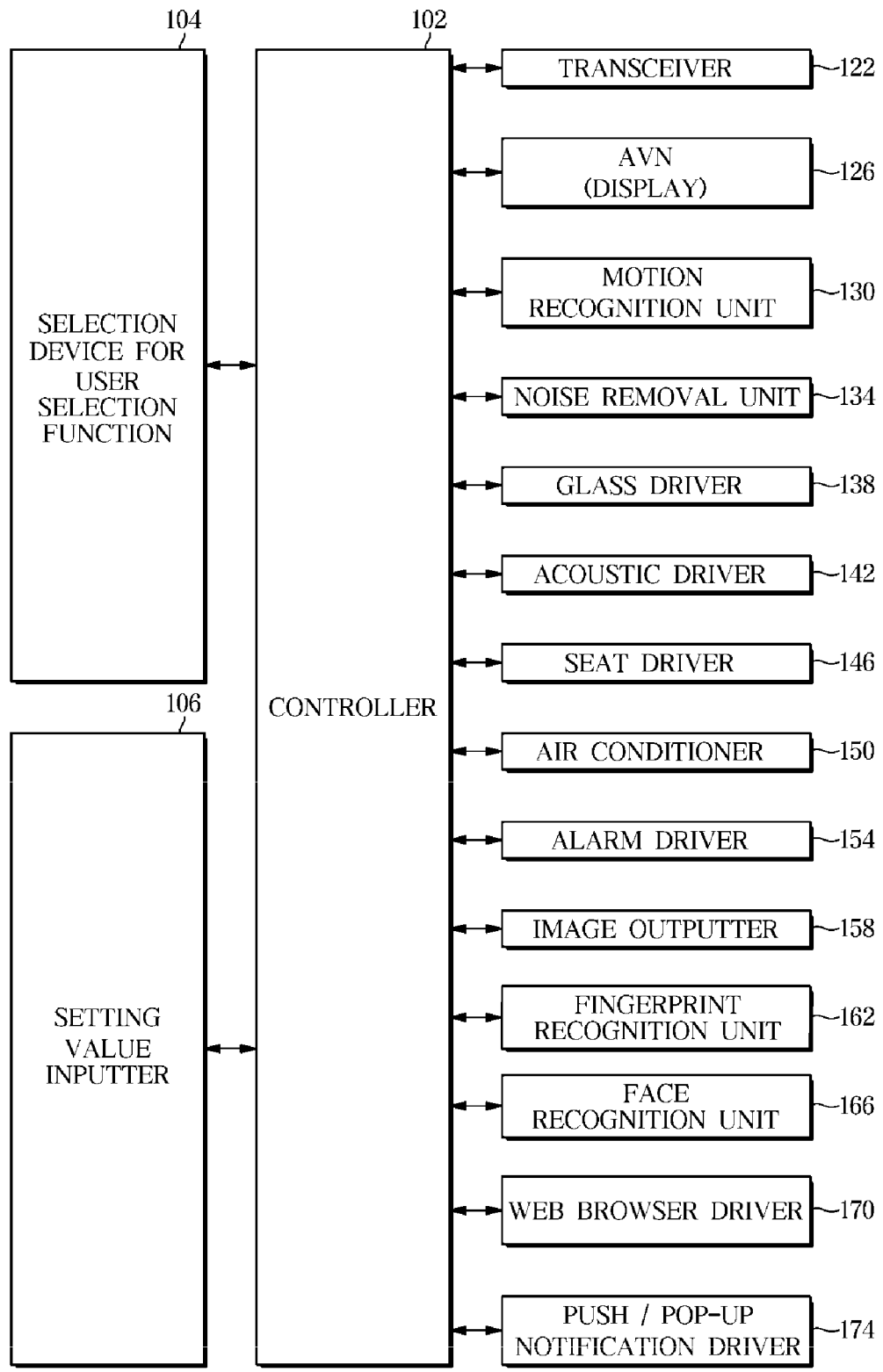
FIG. 1 is a view illustrating a control system of a vehicle according to an exemplary embodiment of the disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

FIG. 1 is a view illustrating a control system of a vehicle according to an exemplary embodiment of the disclosure. The vehicle according to an exemplary embodiment of the disclosure may be an autonomous vehicle that drives by itself even without a driver operating the vehicle (e.g., operates the vehicle without user manipulation).

The controller 102 may be configured to execute the overall operation of the vehicle according to an exemplary embodiment of the disclosure. In particular, the controller 102 may be an electronic control unit (ECU). A selection device 104 for a user selection function and the setting value input device 106 may be connected to the controller 102 to communicate with each other (e.g., via in-vehicle communication, a controller area network or the like).

The selection device 104 for user selection function may be configured to receive a selection of a user selection function provided in advance in the vehicle. At least one (preferably plural plurality) user selection function may be set in the vehicle. Each of the plurality of user selection functions may be configured to automatically perform at least one associated function associated with each of the predetermined operations, that is, the user selection function. The subject of choice of the user selection function is primarily the passenger of the vehicle. In situations where the user selection function of the passenger is unable to be selected (e.g., an emergency), the controller 102 may be configured to select the user selection function of the vehicle.

The setting value input device 106 may be configured to receive input of detailed setting values of the user selection function selected via the selection device 104 for the user selection function. Earlier, it was mentioned that each of the plurality of user selection functions may be configured to perform certain predetermined operations. The setting value input device 106 allows the passenger to change the default setting values, which are the basis for performing a predetermined operation of the selected user selection function, to other values desired by the passenger. For example, when the selected user selection function is a user selection function for 'sleep/meditation', the seat back angle may be converted from the normal angle to a comfortable angle for sleep/meditation (e.g., gentle angle). At this time, the passenger may change the seat back angle from the default setting angle to another angle desired by the passenger using the setting value input device 106. Changing the setting value (state) is optional and may include the transition to activation or deactivation of the item.

In addition, a plurality of devices provided within the vehicle may be communicatively connected to the controller 102 to perform each of the plurality of user selection functions. These devices may be physical hardware or some specific function (logic) implemented in software. However, for convenience, all of these will be referred to as 'devices'. Devices that are communicatively connected to the controller 102 may include a transceiver 122, an Audio Video Navigation (AVN) 126, a motion recognition unit 130, a noise removal unit 134, a glass driver 138, an acoustic driver 142, a seat driver 146, an air conditioner 150, an alarm driver 154, an image output device 158, a fingerprint recognition unit 162, a face recognition unit 166, a web browser driver 170, and a push/pop-up notification driver 174. The devices connected to communicate with the controller 102 are not limited to those shown in FIG. 1, and some devices may be deleted or further added according to a user selection function implemented in a vehicle according to an exemplary embodiment of disclosure.

The transceiver 122 is a device for the vehicle or passenger to communicate with the outside. The vehicle or the passenger may use various communication services including a telephone, the Internet, a video meeting, a text message, an SNS, and an emergency call using the transceiver 122. The AVN 126 is a device that integrates audio, video and navigation functions. The AVN 126 provides a playback and streaming function of an audio sound source and a video, and is configured to perform route guidance through navigation. The AVN 126 may include a display configured to display a necessary image (screen) through this display. For example, a web browser may be displayed via the display of the AVN 126. The display of the AVN 126 may be a touch panel display supporting touch input.

The motion recognition unit 130 may be configured to capture the motion of the passenger. The types of commands that passengers generate to use various functions of the vehicle, in addition to manipulation of the user interface, exist in various ways through the generation of voice commands or gestures. The motion recognition unit 130 may be configured to capture or photograph the passenger's motion when the passenger generates a command through the gesture, and the controller 102 may be configured to analyze the captured motion to determine what the passenger's gesture indicates or which function the gesture corresponds to. In particular, the gesture and the corresponding function may be stored in advance.

The noise removal unit 134 may be configured to remove or reduce noise generated inside the vehicle and noise introduced from the outside of the vehicle. For example, when a particular user selection function selected by the passenger requires a very quiet environment, the controller 102 may be configured to operate the noise removal unit 134 to remove or reduce noise generated inside the vehicle and noise introduced from the outside of the vehicle. Accordingly, the noise removal unit 134 may use a real-time active noise cancellation (RANC) function.

The glass driver 138 may be configured to operate various windows provided within the vehicle. In particular, the glass driving unit 138 may be configured to lower a light transmittance of the glass of the vehicle to maintain security inside the vehicle and thus, the inside of the vehicle is unable to be observed from the outside (e.g., privacy glass or tint). For this purpose, the glass of the vehicle adopts a variable light transmittance glass. In addition, the glass driver 138 may be configured to adjust the brightness of the vehicle interior by adjusting the light transmittance of the variable light transmittance glass. For example, the light transmittance of the glass may be lowered in the sleep/meditation mode to lower the illuminance of the vehicle interior to help sleep. In particular, the glass driver 138 may be configured to adjust the lighting inside the vehicle together with the light transmittance of the glass to adjust the illuminance of the vehicle interior to a desired level.

The acoustic driver 142 may be configured to output sound through the speaker inside the vehicle. In particular, the acoustic driver 142 may be configured to perform an independent sound field function that provides independent sounds for various spaces inside the vehicle under the operation of the controller 102. The seat driver 146 may be configured to change of the seat position installed within the vehicle. For example, the seat driving unit 146 may be configured to change the front and rear positions and heights of the seat, the backrest angle, and the like. The seat position may be changed in response to the passenger's manipulation or may be changed by the operation of the controller 102.

The air conditioner 150 may be configured to adjust the temperature inside the vehicle. In other words, the controller 102 may be configured to operate the air conditioner 150 to allow cooling or heating inside the vehicle. In addition, the controller 102 may be configured to eject the aromatic material through the air conditioner 150 to allow air freshing to be performed inside the vehicle. The alarm driver 154 may be configured to output an alarm when a predetermined time elapses. For example, when the alarm is set to the time that the passenger wants to wake up when the passenger is sleeping, the controller 102 may be configured to output the alarm through the alarm driver 154 at the set time to wake up the passenger.

The image output device 158 may be configured to generate (photograph), reproduce, and output image content in a vehicle. In particular, the image output device 158 may be configured to photograph the inside of the vehicle and record (e.g., store) the image. Additionally, the image output device 158 may be configured to output an image through the display of the AVN 126 described above. The image out device 158 may also be configured to output an image to a head-up display (HUD) to the indoor side surface of the windshield under the operation of the controller 102. Accordingly, the image output device 158 may include a camera configured to capture an image, a memory configured to store the image, and a HUD device configure to display a HUD image.

The fingerprint recognition unit 162 may be configured to recognize a fingerprint of a passenger. Fingerprint recognition through the fingerprint recognition unit 162 may be for verification the passenger's identity. For example, when it is necessary to verify an identity for login, e-commerce, and payment of a specific website, the fingerprint recognition unit 162 may be configured to detect a fingerprint and confirm the identity of a passenger by comparing with a fingerprint registered in advance (e.g., stored in a database).

The face recognition unit 166 may be configured to recognize a passenger's face. Similar to the fingerprint recognition unit 162, the face recognition unit 166 may also be for verification the identity of the passenger. For example, when it is necessary to verify an identity for login, e-commerce, and payment of a specific website, the face recognition unit 166 may be configured to detect a face and confirm the identity of a passenger by comparing with a face registered in advance (e.g., stored in a database). In exemplary embodiments of the disclosure, face recognition may include iris recognition. Accordingly, the face recognition unit 166 may further include a process for iris recognition.

The web browser driver 170 may be configured to operate a web browser allowing passengers to use the Internet service. The screen of the web browser driven by the web browser driver 170 may be displayed through the display of the AVN 126 or may be projected on a surface of a specific part of the vehicle (e.g., the indoor side surface of the windshield).

The push/popup notification driver 174 may be configured to receive a push/popup notification transmitted to a passenger from a specific service related to the passenger and delivering the notification to the passenger. Push/pop-up notifications received via the transceiver 122 may be displayed through a mobile device (not shown) carried by the passenger, or may be displayed through the display of the AVN 126, or may be projected on a surface of a particular part inside the vehicle (e.g., the interior side surface of the windshield).

Figure 2:
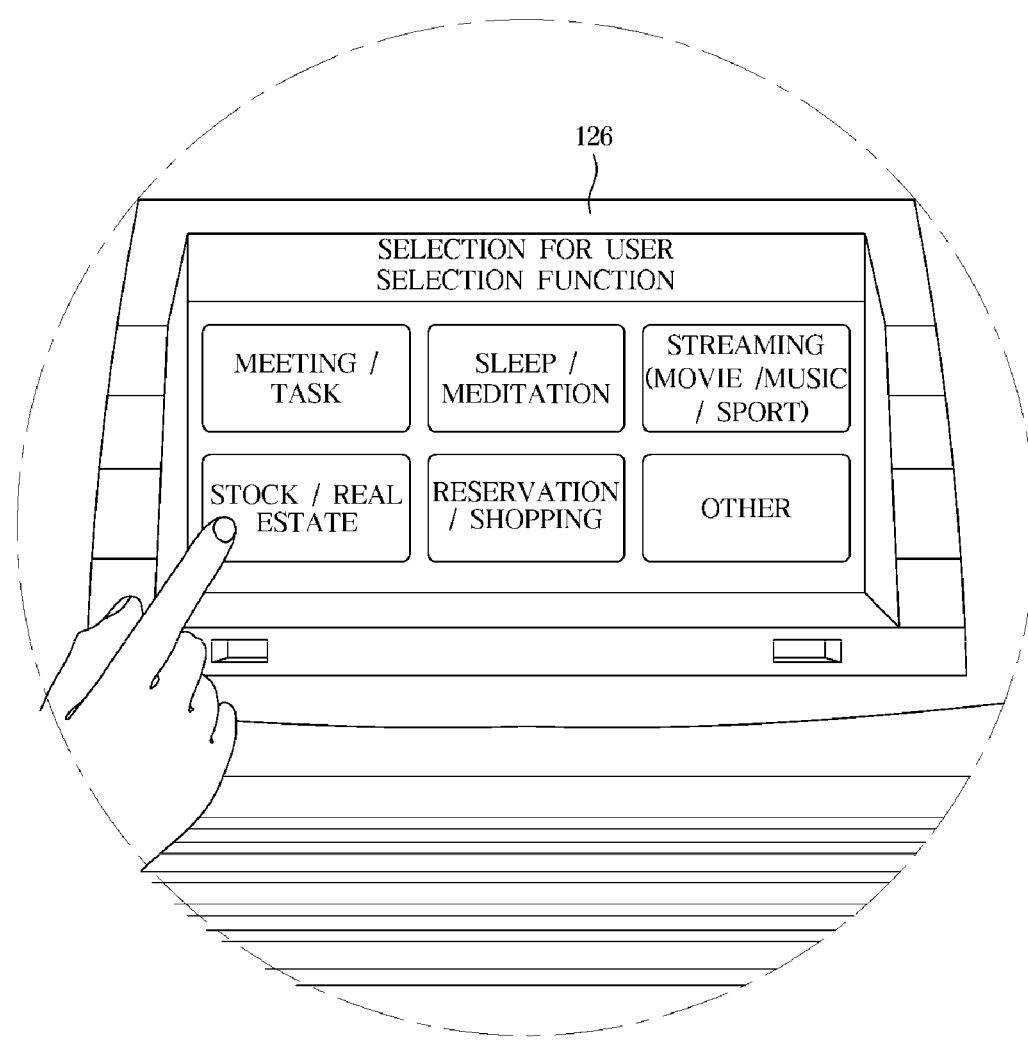
FIG. 2 is a view illustrating that a passenger of a vehicle according to an exemplary embodiment of the disclosure selects a user selection function.

FIG. 2 is a view illustrating that a passenger of a vehicle according to an exemplary embodiment of the disclosure selects a user selection function. As shown in FIG. 2, a screen for the passenger to select a user selection function may be displayed on the display of the AVN 126. The passenger may select a desired user selection function on a screen for selecting a user selection function displayed on the display of the AVN 126. The selection of the user selection function may include detecting a touch on the screen of the AVN 126 or detecting a voice command as shown in FIG. 2.

FIG. 2 illustrates various exemplary embodiments of a user selection function of a vehicle according to an exemplary embodiment of disclosure. For example, a user selection function of a vehicle according to an exemplary embodiment of disclosure may include user selection functions such as 'meeting/task', 'sleep/meditation', 'streaming (movie/music/sport)', 'stock/real estate', 'reservation/shopping', 'other'. Various user selection functions of such a vehicle will be described in detail with reference to FIGS. 4 to 8 to be described later.

Figure 3:
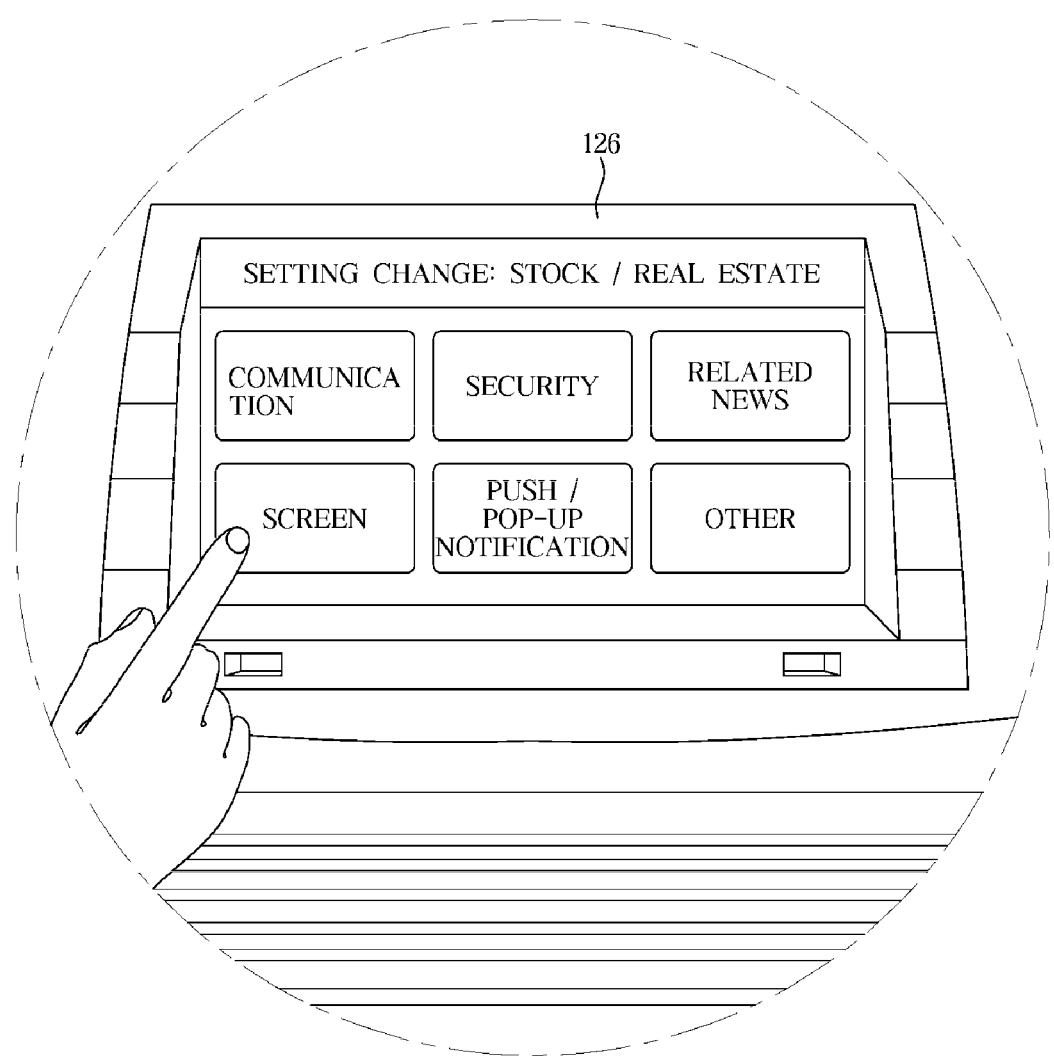
FIG. 3 is a view illustrating a change in a setting value of a selected user selection function of a vehicle according to an exemplary embodiment of the disclosure.

FIG. 3 is a view illustrating a change in a setting value of a selected user selection function of a vehicle according to an exemplary embodiment of the disclosure. As shown in FIG. 3, when the user selection function selected by the passenger is in the 'stock/real estate' mode, the display of the AVN 126 may be configured to display various setting items related to the 'stock/real estate' mode. For example, the setting values of the 'stock/real estate' items may include 'communication', 'security', 'related news', 'screen', 'push/pop-up notification', 'other', and the like. The passenger may select various setting values displayed on the display of the AVN 126 by touching and change them to a desired value (state). Changing the setting value (state) may include the transition to activation or deactivation of the item.

Figure 4:
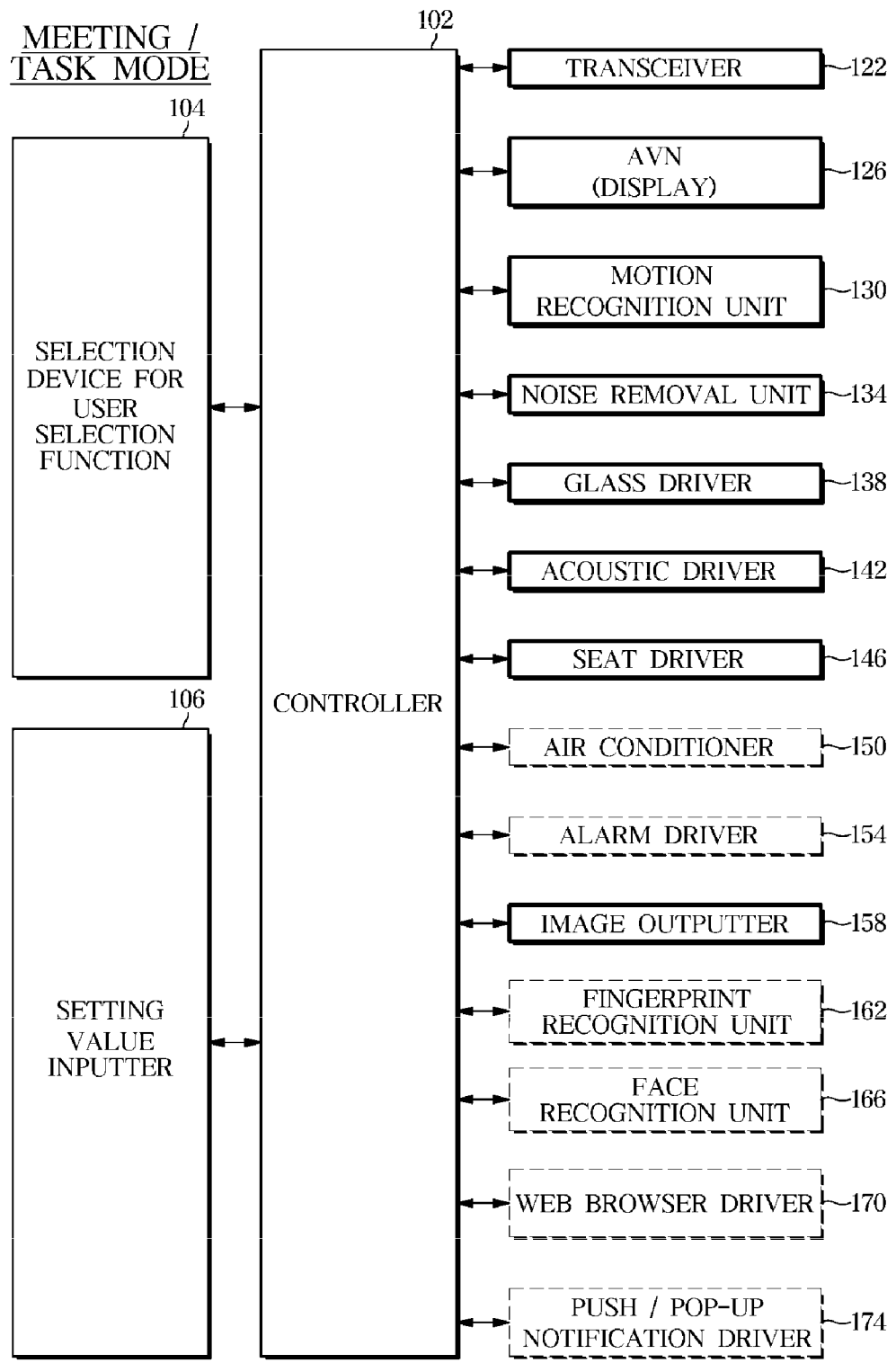
FIG. 4 is a view illustrating a 'meeting/task' mode of the vehicle according to an exemplary embodiment of the disclosure.

FIGS. 4 to 8 illustrate various user selection functions of a vehicle according to an exemplary embodiment of the disclosure. FIGS. 4 to 8 specifically illustrate user selection functions of 'meeting/task', 'sleep/meditation', 'streaming (movie/music/sport)', 'stock/real estate', and 'reservation/shopping', respectively. FIG. 4 is a view illustrating a 'meeting/task' mode of the vehicle according to an exemplary embodiment of the disclosure. The 'meeting/task' mode is a user selection function to help passengers conduct meetings and tasks conveniently and effectively.

As shown in FIG. 4, in the 'meeting/task' mode, the transceiver 122, the AVN 126, the motion recognition unit 130, the noise removal unit 134, the glass driver 138, the acoustic driver 142, the sheet driver 146, and the image output device 158 may be selected and activated among a plurality of devices connected to communicate with the controller. The devices selected at this time are devices that to be activated when the 'meeting/task' mode is selected. When in the 'meeting/task' mode, the controller 102 may be configured to activate the transceiver 122 to allow the vehicle and the passengers to communicate with the outside. In particular, the communication may include a telephone, the Internet, a video meeting, a text message, an SNS, and an emergency call.

Additionally, when in 'meeting/work' mode, the controller 102 may be configured to adjust the route of the AVN 126 to avoid the communication shaded area and move to the communication stable area to allow the vehicle and the passenger to use the stable communication service. In other words, if the route to the target point currently set in the AVN 126 passes through the communication shaded area, the target point may be reached by a new route that avoids the communication shaded area by changing the route. By adjusting the route to avoid the communication shaded area, vehicle and passengers may always use stable communication service in 'meeting/task' mode. If it is impossible to completely avoid communication shaded areas, the route with the farthest distance to the initial communication shaded area entry may be selected, and the distance to the corresponding communication shaded area may be displayed on the display of the AVN 128 to allow the user to recognize it.

Alternately, if it is impossible to completely avoid the communication shaded area, the vehicle may be configured to search and display a smooth communication area in which the vehicle is able to park or stop on the display of the AVN 128 before entering the initial communication shaded area. When the user selects one of the smooth communication area in which the vehicle is able to park or stop displayed on the display, the driving route of the vehicle may be selected as the selected smooth communication area in which the vehicle is able to park or stop. In particular, in 'meeting/task' mode, the communication speed needs to be high enough to support video meetings (e.g., 1 Mbps or more). Therefore, when resetting a route, it is desirable to select a route that supports a high communication speed where video meeting is possible. The communication shaded area refers to an area in which the communication state is unstable due to the influence of the terrain or the deterioration of the communication facility such as an underground parking lot.

If it is impossible to adjust the driving route to avoid the communication shaded area, the controller 102 may be configured to change the driving route of the vehicle to allow the vehicle to pass through the smooth communication area where the vehicle is able to park or stop before entering the communication shaded area. In other words, even if it is slightly out of the moving route to the destination, it may be possible to prevent the communication of the vehicle from being disconnected by stopping or parking for a period of time as the vehicle passes through the smooth communication area. When the vehicle enters the communication shaded area when the vehicle passes through the smooth communication area and then departs again and moves to the destination, The controller 102 may be configured to output a notification to the passenger by displaying in advance that the vehicle is to enter the communication shaded area through a display inside the vehicle before a particular time or distance prior to the vehicle entering the communication shaded area. The adjustment of the driving route of the vehicle may be performed when the vehicle requires communication with the outside. In addition, the adjustment of the driving route of the vehicle may be performed when the vehicle is in an autonomous driving state without driver intervention.

In addition, the controller 102 may be configured to detect a gesture of a passenger in advance using the motion recognition unit 130 and grant a right to speak to the passenger of the gesture during the meeting or task. In addition, the controller 102 may be configured to remove or reduce noise (e.g., road noise, engine sound, exhaust sound, etc.) introduced from the outside of the vehicle using the noise removal unit 134 during a meeting or task. In addition, the controller 102 may be configured to disable the audio/video function of the AVN 126 to prevent the output of sound.

Further, the controller 102 may be configured to lower the light transmittance of the glass using the glass driver 138 during the meeting or the task to provide privacy to the inside of the vehicle from the outside of the vehicle. In the meeting/task mode, it is necessary to make the observation inside the vehicle impossible by adjusting the light transmittance of the glass to prevent information leakage. In addition, the controller 102 may be configured to provide independent sound at each position of the passengers through the acoustic driver 142 to facilitate communication between the passengers during the meeting or task.

The controller 102 may also be configured to adjust the seat inside the vehicle to a seat position suitable for the meeting or the task using the seat driver 146 during the meeting or the task. For example, if the backrest angle of the seat is too gentle (e.g., too far in a backward position), it is not suitable for meeting or task. In meeting/task mode, the seatback angle of the seat may be adjusted to the level of the backrest of the general chair. Alternatively, the seats may be adjusted to allow a plurality of passengers to face each other. The controller 102 may also be configured to photograph the inside of the vehicle using the image output device 158 and store the image in the memory to leave the meeting or task content as an image record during a meeting or task.

Figure 5:
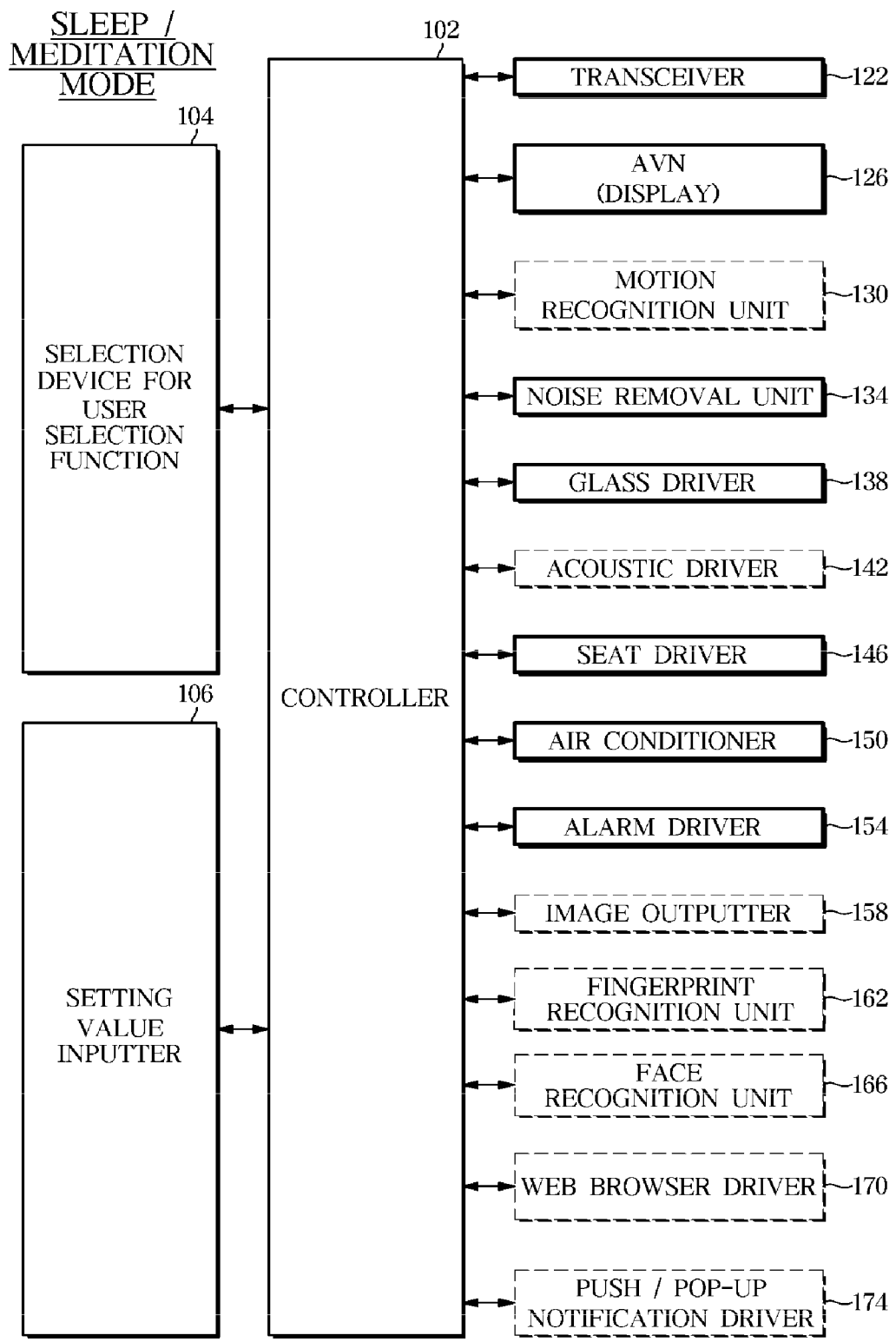
FIG. 5 is a view illustrating the 'sleep/meditation' mode of the vehicle in detail according to an exemplary embodiment of the disclosure.

FIG. 5 is a view illustrating the 'sleep/meditation' mode of the vehicle in detail according to an exemplary embodiment of the disclosure. The 'sleep/meditation' mode is a service that requires a low noise state and is a user selection function to help passengers sleep or meditate quietly. As shown in FIG. 5, in the 'sleep/meditation' mode, the transceiver 122, the AVN 126, the noise removal unit 134, and the glass driver 138, the seat driver 146, the air conditioner 150, and the alarm driver 154 among the plurality of devices connected to communicate with the controller 102 may be selected and activated. The devices selected at this time may be activated in advance when the 'sleep/meditation' mode is selected.

When in 'sleep/meditation' mode, the controller 102 may be configured to activate the transceiver 122 to allow the vehicle and passengers to communicate with the outside. In particular, the communication may include a telephone, the Internet, a video meeting, a text message, an SNS, and an emergency call. The controller 102 may also be configured to adjust the route of the AVN 126 to avoid a route with poor road conditions to ensure a comfortable ride when in the 'sleep/meditation' mode. In other words, severe vibrations, irregularities, and sharp turns in the 'sleep/meditation' mode may disturb the passengers' sleep or meditation. Therefore, in 'sleep/meditation' mode, the route may be adjusted by searching for routes with even roads and fewer sharp turns. It may also be possible to avoid routes that are expected to cause loud noises, and to search and select routes that are capable of quiet operation.

In addition, the controller 102 may be configured to remove or reduce noise (e.g., road noise, engine sound, exhaust sound, etc.) introduced from the outside of the vehicle using the noise removal unit 134 while the passenger sleeps or meditates. By removing or reducing external noise, passengers may sleep or meditate in a quiet and relaxing atmosphere. The controller 102 may also be configured to lower the light transmittance of the glass through the glass driver 138 while the passenger is sleeping or meditating, thereby lowering the illuminance inside the vehicle and allowing the passenger to maintain a comfortable and stable psychological state. At this time, the glass driver 138 may be configured to adjust the lighting inside the vehicle together with the light transmittance of the glass to lower the illuminance inside the vehicle.

The controller 102 may also be configured to adjust the seat inside the vehicle to a seat position suitable for sleep or meditation using the seat driver 146. For example, the seat back angle may be adjusted gently to allow passengers to sleep or meditate in a comfortable position. In addition, the controller 102 may be configured to emit a scent to help sleep or meditation while maintaining the air inside the vehicle fresh through the air conditioner 150.

Further, the controller 102 may be configured to wake up the passenger from sleep or meditation by outputting an alarm at a time set by the passenger using the alarm driver 154. When the passenger desires sleep, the alarm may be set to a desired time to wake up, and the controller 102 may be configured to output an alarm through the alarm driver 154 at the time set by the passenger to wake up the passenger from sleep or meditation.

Figure 6:
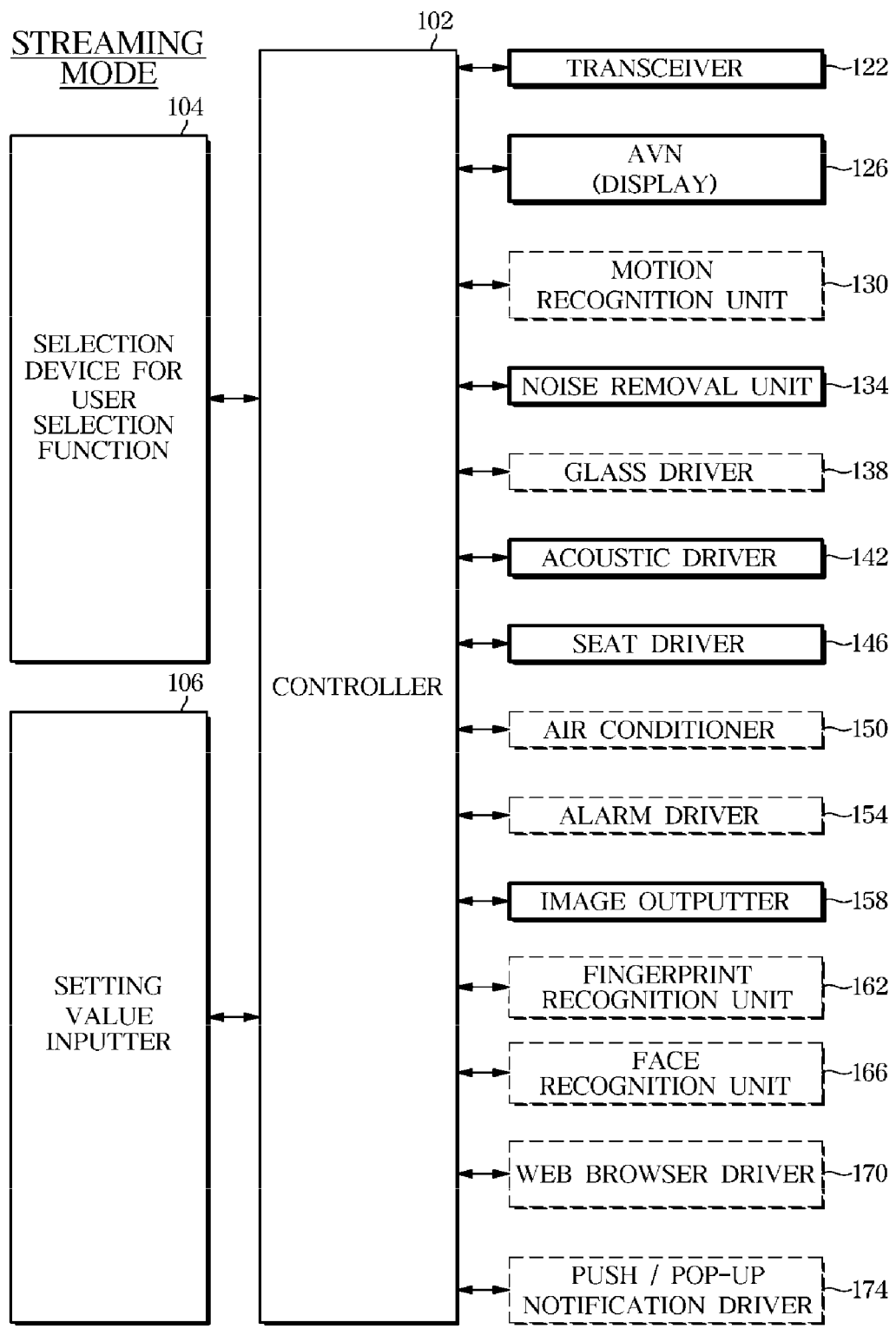
FIG. 6 is a view illustrating the 'streaming (movie/music/sports)' mode of the vehicle in detail according to an exemplary embodiment of the disclosure.

FIG. 6 is a view illustrating the 'streaming (movie/music/sports)' mode of the vehicle in detail according to an exemplary embodiment of the disclosure. The Streaming (Film/Music/Sports) mode is a user selection function to help passengers comfortably watch movies or music or watch sports broadcasts. As shown in FIG. 6, in the 'streaming (movie/music/sport)' mode, a transceiver 122, an AVN 126, a noise removal unit 134, the sound driver 142, the sheet driver 146, and the image output device 158 among a plurality of devices communicatively connected to the controller 102, may be selected and activated. The devices selected at this time are the devices to be activated in advance when the 'streaming (movie/music sport)' mode is selected.

When in the 'streaming (movie/music/sport)' mode, the controller 102 may be configured to activate the transceiver 122 to allow the vehicle and passengers to communicate with the outside. In particular, the communication may include a telephone, the Internet, a video meeting, a text message, an SNS, and an emergency call. The controller 102 may be configured to provide a streaming service of a movie, music, and sports broadcasts to passengers in the vehicle through an Internet service. In addition, the controller 102, when in the 'streaming (movie/music/sport)' mode, may be configured to adjust the route of the AVN 126 to avoid the communication shaded area and move to the communication stable area to provide a stable communication service to the vehicle and passengers. In other words, if the route to the target point currently set in the AVN 126 passes through the communication shaded area, the route may be changed to reach the target point with a new route that avoids the communication shaded area.

By adjusting the route to avoid the communication shaded area, the vehicle and passengers may always use stable communication service in 'streaming (movie/music/sport)' mode. In the 'meeting/task' mode, a relatively high communication speed route was selected to support video meeting. However, in streaming (movie/music/sport), streaming services are possible even at relatively slower communication speeds (e.g., 4 kbps) than video meetings. Therefore, it is desirable to widen the route selection in consideration of this in resetting the route. The communication shaded area refers to an area in which the communication state is unstable due to the influence of the terrain or the deterioration of the communication facility such as an underground parking lot.

In addition, the controller 102 may be configured to remove or reduce noise (e.g., road noise, engine sound, exhaust sound, etc.) introduced from the outside of the vehicle using the noise removal unit 134 during the streaming service. By removing or reducing external noise, passengers may hear the sound contained in streaming content at higher quality without outside disturbance. In addition, the controller 102 may be configured to provide independent sound at each passenger position using the sound driver 142 to provide higher quality sound during the streaming service.

Further, the controller 102 may be configured to adjust the seat inside the vehicle to a seat position suitable for viewing the streaming service using the seat driver 146 while the streaming service is in progress. For example, when listening to music, the backrest angle of the seat may be gently adjusted to allow the user to listen to the music in a comfortable posture. Alternatively, when watching a movie or watching a sports broadcasts, the backrest angle of the seat may be adjusted to the level of the backrest of a general chair. Alternatively, the sheet orientation may be adjusted to face the display (or screen) when watching a movie or watching a sports broadcasts. In addition, the controller 102 may be configured to display an image on a head-up display (HUD) on the interior surface of the windshield using the image output device 158 when watching a movie or watching a sports broadcasts. When using the streaming service, the video may also be displayed through the display of the AVN 126.

Figure 7:
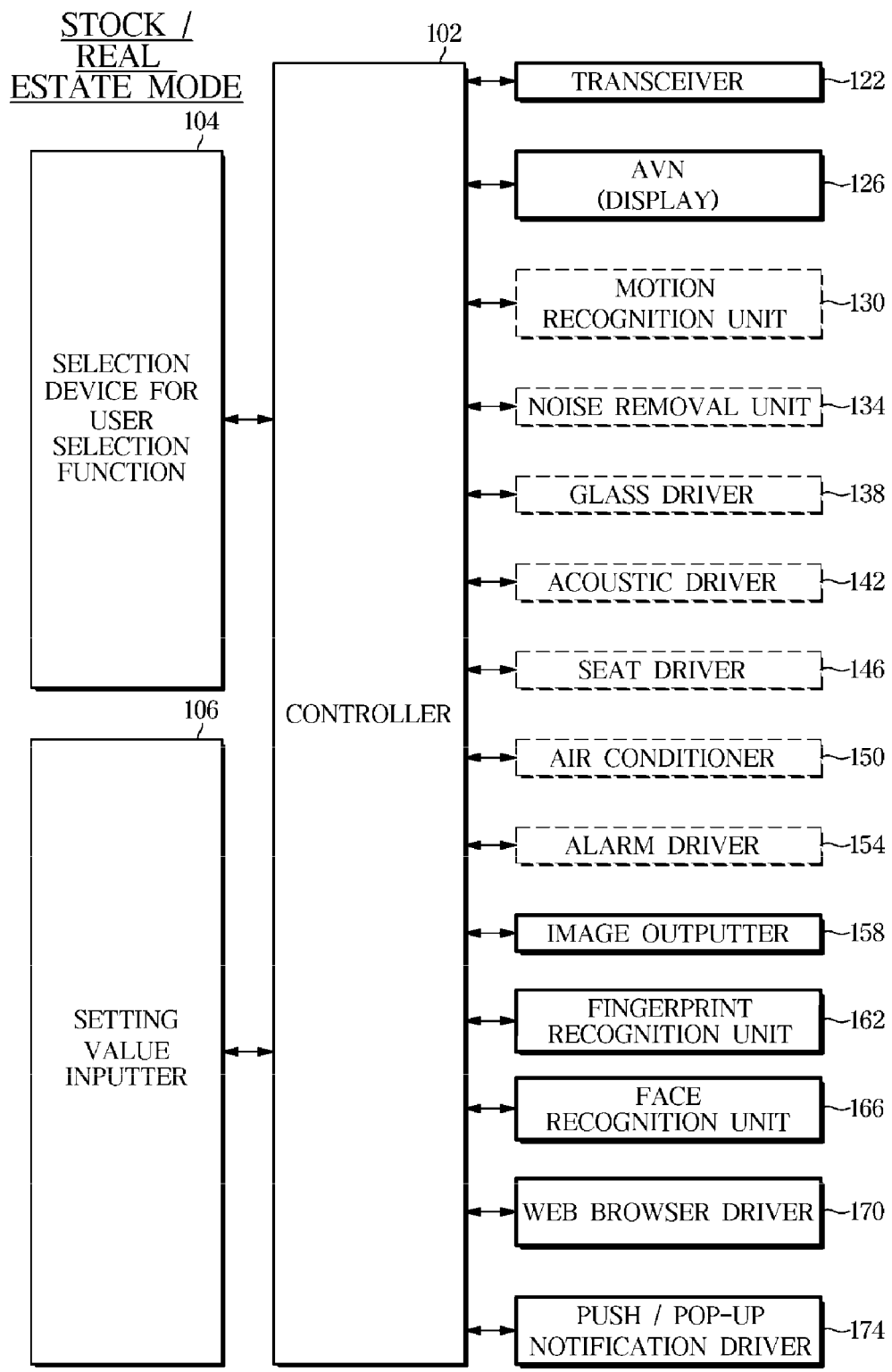
FIG. 7 is a view illustrating the 'stock/real estate' mode of the vehicle in detail according to an exemplary embodiment of the disclosure.

FIG. 7 is a view illustrating the 'stock/real estate' mode of the vehicle in detail according to an exemplary embodiment of the disclosure. The 'stock/real estate' mode is an example of a payment service, which is a user selection function to help passengers conveniently search for stock or real estate related information and perform various actions necessary for investment management. As shown in FIG. 7, in the 'stock/real estate' mode, a transceiver 122, an AVN 126, an image output device 158, a fingerprint recognition unit 162, a face recognition unit 166, a web browser driver 170 and a push/pop-up notification driver 174 among a plurality of devices communicatively connected to the controller 102 may be selected and activated. The devices selected at this time are devices to be activated in advance when the 'stock/real estate' mode is selected.

In the 'stock/real estate' mode, the controller 102 may be configured to activate the transceiver 122 to allow the vehicle and the passengers to communicate with the outside. In particular, the communication may include a telephone, the Internet, a video meeting, a text message, an SNS, and an emergency call. Additionally, when in 'stock/real estate' mode, the controller 102 may be configured to adjust the route of the AVN 126 to avoid the communication shaded area and move to the communication stable area to provide a stable communication service for the vehicle and the passenger.

In other words, if the route to the target point currently set in the AVN 126 passes through the communication shaded area, the target point may be reached by a new route that avoids the communication shaded area by changing the route. By adjusting the route to avoid the communication shaded area, vehicle and passengers may always use stable communication service in 'stock/real estate' mode. The communication shaded area refers to an area in which the communication state is unstable due to the influence of the terrain or the deterioration of the communication facility such as an underground parking lot.

When the controller 102 is in the 'stock/real estate' mode, the controller 102 may be configured to connect to a stock or real estate related site on the Internet and display an image of a corresponding screen on the indoor side surface of the windshield using the image output device 158 in a head-up display (HUD) manner. The controller 102 may also be configured to display an image of a stock or real estate related screen through the display of the AVN 126. Internet access may be implemented through the operation of a web browser, which will be described later.

In addition, the controller 102 may be configured to perform an identity verification procedure for a passenger (user) using at least one of the fingerprint recognition unit 162 and the face recognition unit 166 in the 'stock/real estate' mode. Stock investment or real estate investment requires verification to log in when using the site, and security such as personal information is important, and thus, passenger identification may be performed using at least one of fingerprint recognition and facial recognition (including iris recognition). If possible, both fingerprint recognition and facial recognition (including iris recognition) may be performed.

When the controller 102 is in the 'stock/real estate' mode, the controller 102 may be configured to access the Internet through the web browser driver 170 to access a stock related site or a real estate related site. For example, passengers may use the Internet to search for trends in stocks of interest or to automatically find relevant news. As described above, the screen according to the web browser driving may be displayed on the indoor side surface of the windshield using the image output device 158 in a head-up display (HUD) manner or may be displayed on the display of the AVN 126.

Further, the controller 102 may be configured to receive a push/popup notification using the push/popup notification driver 174 or transmit the notification to the outside when in the 'stock/real estate' mode. For example, the passenger may automatically receive the upper or lower limit price information of the item of interest through the push/popup notification. Passengers may also receive analysis information from stock experts via push/pop-up notifications. In addition, the passenger may receive information on the buy/sell time of the item of interest through the push/pop-up notification.

Figure 8:
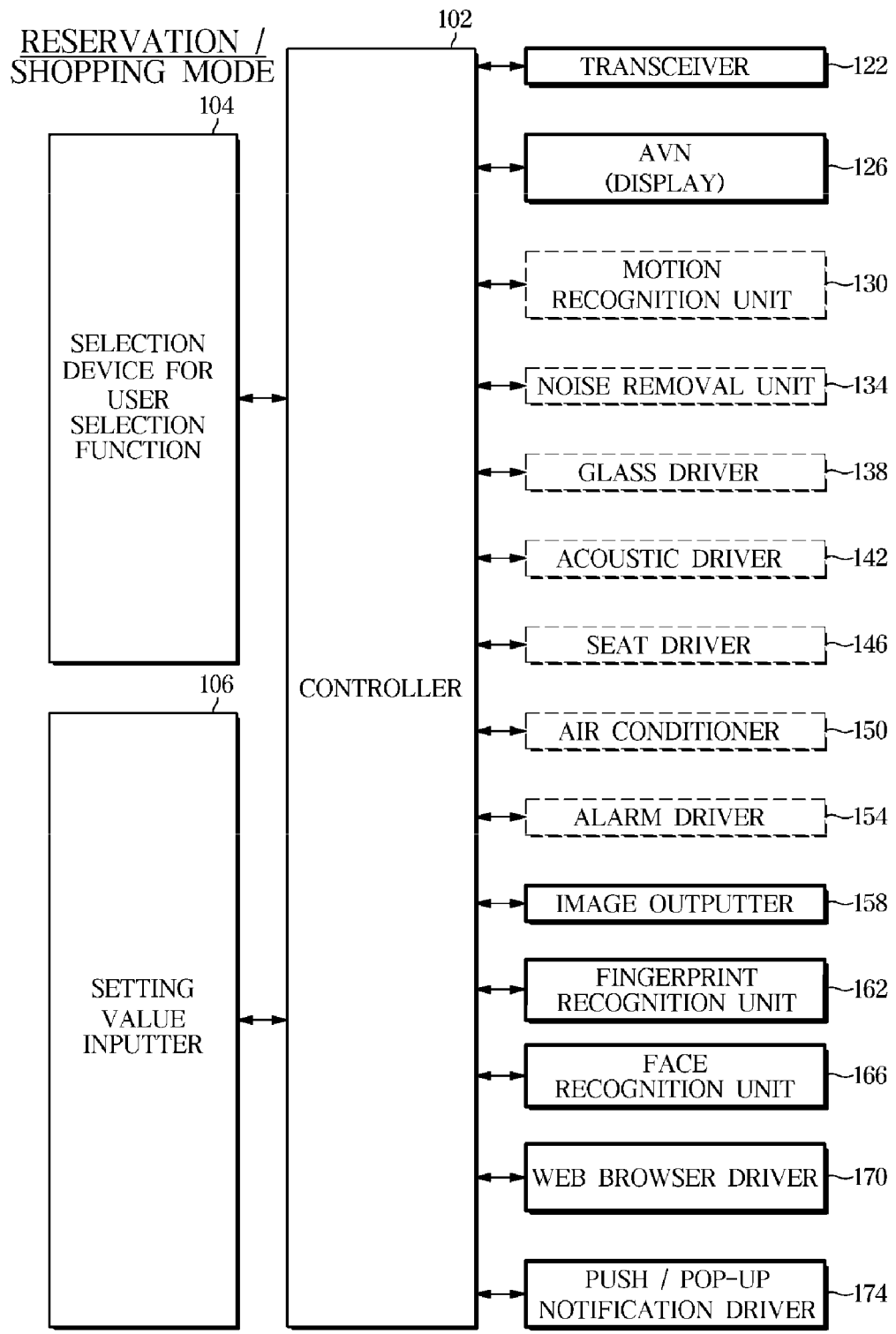
FIG. 8 is a view illustrating the 'reservation/shopping' mode of the vehicle in detail according to an exemplary embodiment of the disclosure.

FIG. 8 is a view illustrating the 'reservation/shopping' mode of the vehicle in detail according to an exemplary embodiment of the disclosure. The 'reservation/shopping' mode is another example of a payment service. The 'reservation/shopping' mode is a user selection function for helping passengers to conveniently perform a performance reservations or restaurant reservations, and perform shopping through e-commerce.

As shown in FIG. 8, in the 'reservation/shopping' mode, a transceiver 122, an AVN 126, an image output device 158, a fingerprint recognition unit 162, a face recognition unit 166, a web browser driver 170, a push/pop-up notification driver 174 among a plurality of devices that are communicably connected to the controller 102 may be selected and activated. The devices selected at this time are devices to be activated in advance when the 'reservation/shopping' mode is selected.

When in the 'reservation/shopping' mode, the controller 102 may be configured to activate the transceiver 122 to allow the vehicle and passengers to communicate with the outside. In particular, the communication may include a telephone, the Internet, a video meeting, a text message, an SNS, and an emergency call. In particular, when a direct call with an agent is required during the reservation or online shopping process, an agent telephone connection may be attempted using the transceiver 122.

Additionally, when in 'reservation/shopping' mode, the controller 102 may be configured to adjust the route of the AVN 126 to avoid the communication shaded area and move to the communication stable area to provide a stable communication service to the vehicle and the passenger. In other words, if the route to the target point currently set in the AVN 126 passes through the communication shaded area, the target point may be reached by a new route that avoids the communication shaded area by changing the route. By adjusting the route to avoid the communication shaded area, vehicle and passengers may always use stable communication service in 'reservation/shopping' mode. The communication shaded area refers to an area in which the communication state is unstable due to the influence of the terrain or the deterioration of the communication facility such as an underground parking lot.

When the controller 102 is in the 'reservation/shopping' mode, the controller 102 may be configured to access a website such as a reservation site or an online shopping mall on the Internet and display an image of a corresponding screen on the indoor side surface of the windshield using the image output device 158 in a head-up display (HUD) manner. The controller 102 may also be configured to display a video of the screen related to the reservation or online shopping through the display of the AVN 126. Internet access may be implemented through the operation of a web browser, which will be described later.

In addition, the controller 102 may be configured to perform an identity verification procedure for a passenger (user) using at least one of the fingerprint recognition unit 162 and the face recognition unit 166 in the 'reservation/shopping' mode. Reservations for performances or restaurants, and online shopping through e-commerce requires verification to log in when using the site, and security such as personal information is important, and thus, passenger identification may be performed using at least one of fingerprint recognition and facial recognition (including iris recognition). If possible, both fingerprint recognition and facial recognition (including iris recognition) may be performed.

Further, when the controller 102 is in the 'reservation/shopping' mode, the controller 102 may be configured to access the Internet using the web browser driver 170 to access a website such as a reservation-related site or an online shopping mall. As described above, the screen according to the web browser driving may be displayed on the indoor side surface of the windshield using the image output device 158 in a head-up display (HUD) manner or may be displayed on the display of the AVN 126. In addition, the controller 102 may be configured to receive a push/popup notification using the push/popup notification driver 174 or transmit the notification to the outside when in the 'reservation/shopping' mode. For example, the passenger may automatically receive a reservation open time such as a performance or discount information of an item of interest through the push/popup notification.

According to an aspect of the disclosure, the convenience of the vehicle passenger may be improved by automatically activating the preset devices according to the preset user selection function.

The above description is merely illustrative of technical ideas, and various modifications, alterations, and permutations will be possible without departing from the essential characteristics of those skilled in the art. Therefore, the exemplary embodiments and the accompanying drawings described above are intended to illustrate and not limit the technical idea, and the scope of technical thought is not limited by these exemplary embodiments and the accompanying drawings. The scope of which is to be construed in accordance with the following claims, and all technical ideas which are within the scope of the same shall be construed as being included in the scope of the right.

What is claimed is:

1. A control method of a vehicle, comprising:
    receiving, by a controller, a selection of at least one user selection function preset in the vehicle;
    determining, by the controller, at least one vehicle environment associated with the user selection function in response to receiving the selection of the at least one user selection function; and
    performing, by the controller, device control of the vehicle controlling a driving route setting of the vehicle or the at least one vehicle environment to support the at least one vehicle environment, wherein the performing device control of the vehicle includes:
        in response to determining the vehicle environment as a smooth communication state with the outside, performing, by the controller, the driving route setting for avoiding a communication shaded area, and
        when the smooth communication state and the driving route setting for avoiding the communication shaded area is impossible, performing, by the controller, a new driving route setting with a route having a distance up to an initial communication shaded area entry that is a farthest distance to keep the smooth communication state longer while the selected user function is performed;
    displaying, by the controller, a distance information up to the initial communication shaded area entry; and
    searching and displaying, by the controller, a smooth communication area in which the vehicle is able to park or stop before entering the initial communication shaded area.

2. The control method of claim 1, wherein the user selection function includes at least one selected from a group consisting of: a meeting, sleep, streaming service, and payment service.

3. The control method of claim 1, wherein the at least one vehicle environment further includes at least one selected from a group consisting of: a low noise state, a seat position adjustment, and a security maintenance state.

4. The control method of claim 3, wherein the performing device control of the vehicle includes: in response to determining the vehicle environment as the low noise state, performing, by the controller, the driving route setting and a noise removal for avoiding a noise area.

5. The control method of claim 3, wherein the performing device control of the vehicle includes:
    in response to determining the vehicle environment as the seat position adjustment, adjusting, by the controller, a seat to a preset angle and position.

6. The control method of claim 3, wherein the performing device control of the vehicle includes:
    in response to determining the vehicle environment as the security maintenance state, adjusting, by the controller, a glass transmittance of the vehicle.

7. The control method of claim 1, further comprising:
in response to receiving the at least one user selection function, displaying, by the controller, a list of the at least one vehicle environment associated with the selected user selection function;
receiving, by the controller, a user input for changing a set value of the at least one vehicle environment displayed; and
performing, by the controller, the driving route setting and the device control of the vehicle by reflecting the setting value changed by the user input.

8. A vehicle, comprising:
a user interface configured to select at least one user selection function preset in the vehicle; and
a controller configured to determine at least one vehicle environment associated with the user selection function in response to receiving the selection of the at least one user selection function and configured to perform a device control of the vehicle controlling a driving route setting of the vehicle or the at least one vehicle environment to support the at least one vehicle environment,
wherein in response to determining the vehicle environment as the smooth communication state with the outside, the controller is configured to perform the driving route setting for avoiding a communication shaded area, and
when a smooth communication state and the driving route setting for avoiding the communication shaded area is impossible, the controller performs a new driving route setting with a route having a distance up to an initial communication shaded area entry that is a farthest distance to keep the smooth communication state longer while the selected user function is performed;
wherein the controller is configured to display a distance information up to the initial communication shaded area entry, and
search and display a smooth communication area in which the vehicle is able to park or stop before entering the initial communication shaded area.

9. The vehicle of claim 8, wherein the user selection function includes at least one selected from a group consisting of: a meeting, sleep, streaming service, and payment service.

10. The vehicle of claim 8, wherein the at least one vehicle environment further includes at least one selected from a group consisting of: a low noise state, a seat position adjustment, and a security maintenance state.

11. The vehicle of claim 10, wherein in response to determining the vehicle environment as in the low noise state, the controller is configured to perform the driving route setting and a noise removal for avoiding a noise area.

12. The vehicle of claim 10, wherein in response to determining the vehicle environment as the seat position adjustment, the controller is configured to adjust a seat to a preset angle and position.

13. The vehicle of claim 10, wherein in response to determining the vehicle environment as the security maintenance state, the controller is configured to adjust a glass transmittance of the vehicle.

14. The vehicle of claim 8, wherein in response to receiving the at least one user selection function, the controller is configured to display a list of the at least one vehicle environment associated with the selected user selection function, receive a user input for changing a set value of the at least one vehicle environment displayed and perform the driving route setting and the device control of the vehicle by reflecting the setting value changed by the user input.

* * * * *